US007018283B2

(12) United States Patent
Schmidt et al.

(10) Patent No.: US 7,018,283 B2
(45) Date of Patent: Mar. 28, 2006

(54) APPARATUS FOR TRANSFERRING POULTRY CARCASSES

(75) Inventors: Michel Schmidt, Rotterdam (NL); Hendrik Jan Arie Verheul, Zwijndrecht (NL)

(73) Assignee: Systemate Group, B.V., Numansdorp (NL)

( * ) Notice: Subject to any disclaimer, the term of this patent is extended or adjusted under 35 U.S.C. 154(b) by 0 days.

(21) Appl. No.: 10/044,682

(22) Filed: Nov. 9, 2001

(65) Prior Publication Data

US 2002/0058470 A1    May 16, 2002

(30) Foreign Application Priority Data

Nov. 9, 2000   (NL)   .................................... 1016572

(51) Int. Cl.
*A22C 21/00*   (2006.01)
(52) U.S. Cl. ...................... 452/182; 452/179; 452/183
(58) Field of Classification Search ................ 452/177, 452/179, 180, 181, 182, 183
See application file for complete search history.

(56) References Cited

U.S. PATENT DOCUMENTS

| 3,137,030 | A | * | 6/1964 | Varner | 452/187 |
| 4,071,924 | A | * | 2/1978 | Meyn | 452/183 |
| 4,574,428 | A | * | 3/1986 | Meyn | 452/182 |
| 4,597,133 | A | * | 7/1986 | van de Nieuwelaar | 452/182 |
| 4,660,256 | A | * | 4/1987 | Innes et al. | 452/167 |
| 4,675,943 | A | * | 6/1987 | Tabata | 452/167 |
| 4,709,448 | A | * | 12/1987 | McGuire et al. | 452/167 |
| 4,756,056 | A | * | 7/1988 | Innes et al. | 452/182 |

(Continued)

FOREIGN PATENT DOCUMENTS

DE            231981     *    1/1986

(Continued)

OTHER PUBLICATIONS

European Search Report.

*Primary Examiner*—Peter M. Poon
*Assistant Examiner*—David J Parsley
(74) *Attorney, Agent, or Firm*—Thomas, Kayden, Horstemeyer & Risley LLP

(57) ABSTRACT

Apparatus for transferring poultry carcasses from a first overhead conveyor to a second overhead conveyor, including a transfer wheel rotatable about a shaft and disposed between the first and the second overhead conveyors. The apparatus also includes a receipt point and a discharge point, the receipt point being disposed between the first overhead conveyor and the transfer wheel, the discharge point being disposed between the transfer wheel and the second overhead conveyor, and the receipt and discharge points are disposed on a centerline of the transfer wheel. The apparatus further includes a plurality of holders, each holder being configured to receive one of the carcasses from the first overhead conveyor at the receipt point and to discharge the carcass to the second overhead conveyor at the discharge point. Each holder has a first orientation at the receipt point and a second orientation at the discharge point, and the first and second orientations are relative to the centerline and are the same.

16 Claims, 7 Drawing Sheets

U.S. PATENT DOCUMENTS

| | | | |
|---|---|---|---|
| 4,791,704 A * | 12/1988 | Chapman | 452/182 |
| 5,125,498 A * | 6/1992 | Meyn | 198/465.4 |
| 5,340,351 A | 8/1994 | Minderman et al. | 452/182 |
| 5,344,360 A * | 9/1994 | Hazenbroek | 452/182 |
| 5,453,045 A | 9/1995 | Hobbel et al. | 452/182 |
| 5,514,033 A * | 5/1996 | Berry | 452/182 |
| 5,672,098 A | 9/1997 | Veraart | 452/182 |
| 6,033,299 A * | 3/2000 | Stone et al. | 452/182 |
| 2002/0031998 A1* | 3/2002 | Kerstholt | 452/188 |

FOREIGN PATENT DOCUMENTS

| | | | |
|---|---|---|---|
| EP | 225306 | * | 6/1987 |
| EP | 0 259 920 | | 8/1987 |
| EP | 235106 | * | 9/1987 |
| EP | 357843 | * | 3/1990 |
| EP | 0 736 255 | | 4/1996 |
| EP | 0 819 382 | | 7/1997 |
| EP | 1 038 443 | | 3/2000 |

\* cited by examiner

APPARATUS FOR TRANSFERRING POULTRY CARCASSES

FIELD OF THE INVENTION

The invention relates to an apparatus for transferring poultry carcasses from a first overhead conveyor to a second overhead conveyor.

BACKGROUND OF THE INVENTION

Such transfer apparatuses are among others known from European patent application 0.259.920 and from U.S. Pat. Nos. 5,453,045 and 5,672,098, the contents of which being included in this text by reference.

The poultry, chicken or turkeys, hanging upside down from their legs or knees in hangers are transferred here from the one overhead conveyor, for instance a cooling line, by means of one or more transfer wheels to a subsequent overhead conveyor, for instance a drip conveyor. Both conveyors can be situated in line with each other, but also at an angle, for instance 90 degrees. It is of importance here which rotation direction both overhead conveyors have with respect to each other. Depending on that an even or odd number of transfer wheels have to be deployed. When the rotation direction is opposite, an odd number of transfer wheels is necessary, the orientation of the carcasses with respect to the line remaining the same. In case of a same rotation direction an even number is necessary, the orientation of the carcasses with respect to the line being reversed. In each case there is question of a central transfer wheel and one or several transfer wheels placed between the central transfer wheel and one or both conveyors, for correction of the rotation direction of the carcasses and/or for synchronisation.

For the slaughter process the orientation of the carcass is of importance.

For the one treatment it is for instance necessary that the carcass is transported with the breast forward through the processing station in question, for another treatment an orientation with the breast to the outside is desirable.

Usually hangers are used the orientation of which with respect to the process path or conveyor is fixed. There are hangers available that are provided with means for rotating the hanger with respect to the trolley in question moving past the conveyor to which trolley the hanger is attached. Such hangers, however, require an additional investment, and moreover are not always suitable to be accommodated in an existing slaughter line.

SUMMARY OF THE INVENTION

It is an object of the invention to provide a provision with which also with the usual "fixed" hangers or leg shackles the orientation of the carcass can be changed, in particular near the transition from the one overhead conveyor to the next overhead conveyor.

From one aspect the invention to that end provides an apparatus for transferring poultry carcasses from a first overhead conveyor to a second overhead conveyor, in which overhead conveyors the carcasses are transported suspended from shackles and the like, comprising a transfer wheel rotatable about a vertical axis and positioned between both overhead conveyors, which wheel is provided with holders for the carcasses and with first means for transferring the carcasses from the first overhead conveyor to the transfer wheel and with second means for transferring the carcasses from the transfer wheel to the second overhead conveyor, orientation means further being present for equalizing the spacial initial orientation of the carcass in the holder at receipt on the transfer wheel and the spacial final orientation of the carcass in the holder at its discharge from the transfer wheel to the second overhead conveyor. In this way it is achieved that the absolute orientation of the carcass during transfer by the transfer wheel can stay unaltered, but that also the orientation with respect to the transfer wheel will change, and for instance the carcass being received on the transfer wheel with breast radially oriented to the inside and being discharged with the breast radially to the outside, to take up an ideal position for the next treatment.

Preferably the orientation means are adapted for keeping the spacial orientation of the carcass in the holder constant during the transport on the transfer wheel. In that case the transfer to the second conveyor can take place at any given point along the circumference of the transfer wheel, and an arrangement with several, second overhead conveyors to be selectively provided with carcasses can be realised.

Preferably the holders are bearing mounted in the transfer wheel to be rotatable about themselves about a vertical axis. It is furthermore preferred here that the orientation means are adapted for relative rotation of the holders with respect to the transfer wheel, preferably for letting the holders rotate 1:1 with the transfer wheel.

In a further development of the apparatus according to the invention the orientation means comprise first orientation means for orienting a first of the holders, and second orientation means for orienting others of the holders, which second orientation means are operated by the first orientation means, in which way a simple sequential drive of the holders is thus realised.

It is preferred here that the first orientation means comprise a first driving disc provided on the first holder, a second driving disc placed loosely on the axis but retained in spacial orientation, and a driving belt or driving chain running around both, the diameter of both driving discs preferably being equal.

In order to always guarantee a pure orientation of the holders, even after a longer operative time, it is preferred that the orientation means are further provided with a tension pulley for the driving belt or driving chain.

In a further development of the orientation means the second orientation means comprise a first toothed wheel that is attached to the first holder in a rotatably fixed manner, a central toothed wheel freely rotatable on the axis and driven by the first toothed wheel, as well as second toothed wheels attached in a rotatably fixed manner to every other holder, which second toothed wheels are in driving engagement with the central toothed wheel and preferably have a diameter that is equal to the one of the first toothed wheel.

From another aspect the invention provides an apparatus for transferring poultry carcasses from a first overhead conveyor to a second overhead conveyor, in which overhead conveyors the carcasses are transported suspended from shackles and the like, comprising a transfer wheel rotatable about a vertical axis and positioned between both overhead conveyors, which wheel is provided with holders for the carcasses and with first means for transferring the carcasses from the first overhead conveyor to the transfer wheel and with second means for transferring the carcasses from the transfer wheel to the second overhead conveyor, orientation means further being present for rotating the holders with respect to the transfer wheel during the transport of the holders by the transfer wheel.

Preferably the orientation means are adapted for 1:1 rotation of the holders and the transfer wheel.

From a further aspect the invention provides a holder for suspended transport of a poultry carcass, provided with accommodation spaces for the legs of the carcass, the accommodation spaces each forming a continuous slit in horizontal direction. In this way it is achieved that the carcass can be discharged from the holder in a direction which is the same as the direction of insertion of the carcass into the holder. As a result rotation of the holder can be dispensed with under conditions.

Preferably the distance between the accommodation spaces at their one end is different from the distance therebetween at their other end. In this way in a transfer wheel with such holders a fluent, and possibly direct accommodation/transfer of the carcasses becomes possible in case the distance between the legs in the hangers of the first overhead conveyor is different from the one of the hangers of the second overhead conveyor.

The invention further provides an apparatus of the aforementioned type, provided with such holders.

The invention further provides a method as described in this application.

BRIEF DESCRIPTION OF THE DRAWINGS

The invention will be elucidated on the basis of the exemplary embodiment shown in the attached drawings, in which.

DETAILED DESCRIPTION

Figure 1A:
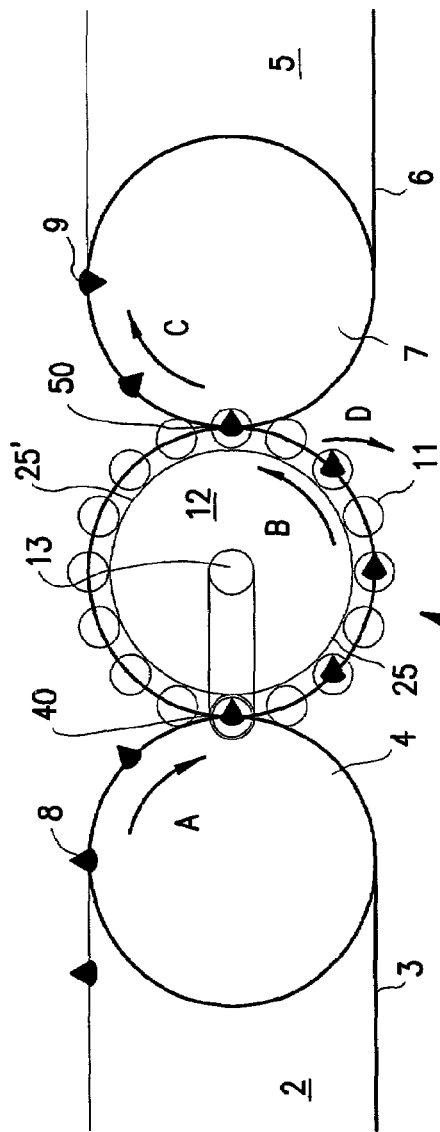
FIG. 1A schematically shows a top view of transfer apparatus according to the invention, placed between two overhead conveyors.

In FIG. 1A a transfer apparatus 1 is shown, by means of which carcasses, supplied on a first overhead conveyor 2, for instance a cooling conveyor, are supplied in the direction A, suspended from hangers 8 on a transport line, such as a rail and/or a chain 3. The overhead conveyor 2 is turned about rotation wheel 4, the carcasses being transferred from the overhead conveyor 2 onto transfer wheel 12 of the transfer apparatus 10 at the location of transfer station 40. At the downstream side of the transfer apparatus 10 a second overhead conveyor 5 is placed, for instance a drip conveyor, having a transport line 6 and a rotation wheel 7, along which the holders 9 transported with the transport line 6 are moved in the direction C, past transfer station 50, where the carcasses from the transfer apparatus 10 are received.

The transfer apparatus 10 here is substantially shown with a vertical rotation axis along shaft 13 and a transfer wheel 12, on which the carcass holders 11 are supported to rotate along in the direction B.

Figure 1B:
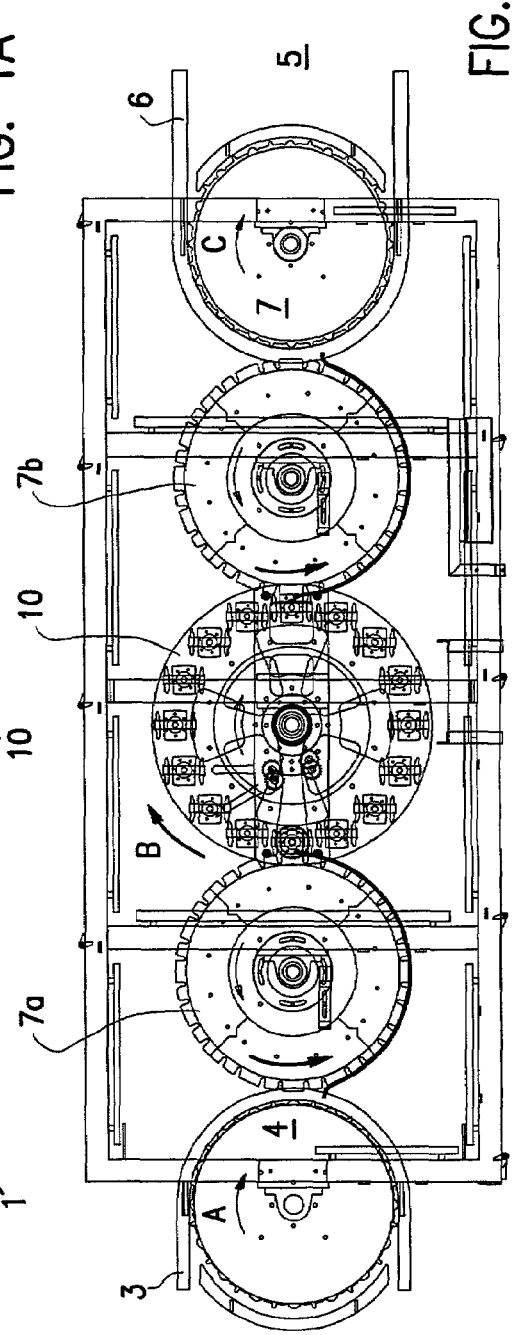
FIG. 1B schematically shows a top view of a transfer apparatus according to the invention, placed between two overhead conveyors, in alternative arrangement.

Other arrangements are conceivable, such as shown in FIG. 1B, wherein between the turning wheel 4 and the transfer wheel 12 and/or between the turning wheel 7 and the transfer wheel 12 simple transfer wheels 7a, 7b, at their edges provided with notches for accommodation of the legs of the carcasses, have been placed, for reversing the direction of rotation of the path of the carcasses and/or alteration in the pitch between the carcasses. The synchronisation means necessary for it and the driving means are not further discussed here. They are known per se to the expert, referring as well to U.S. Pat. Nos. 5,453,045 and 52,672,098, as well as European patent application 0.259.920, all incorporated herein by reference.

Figure 2:
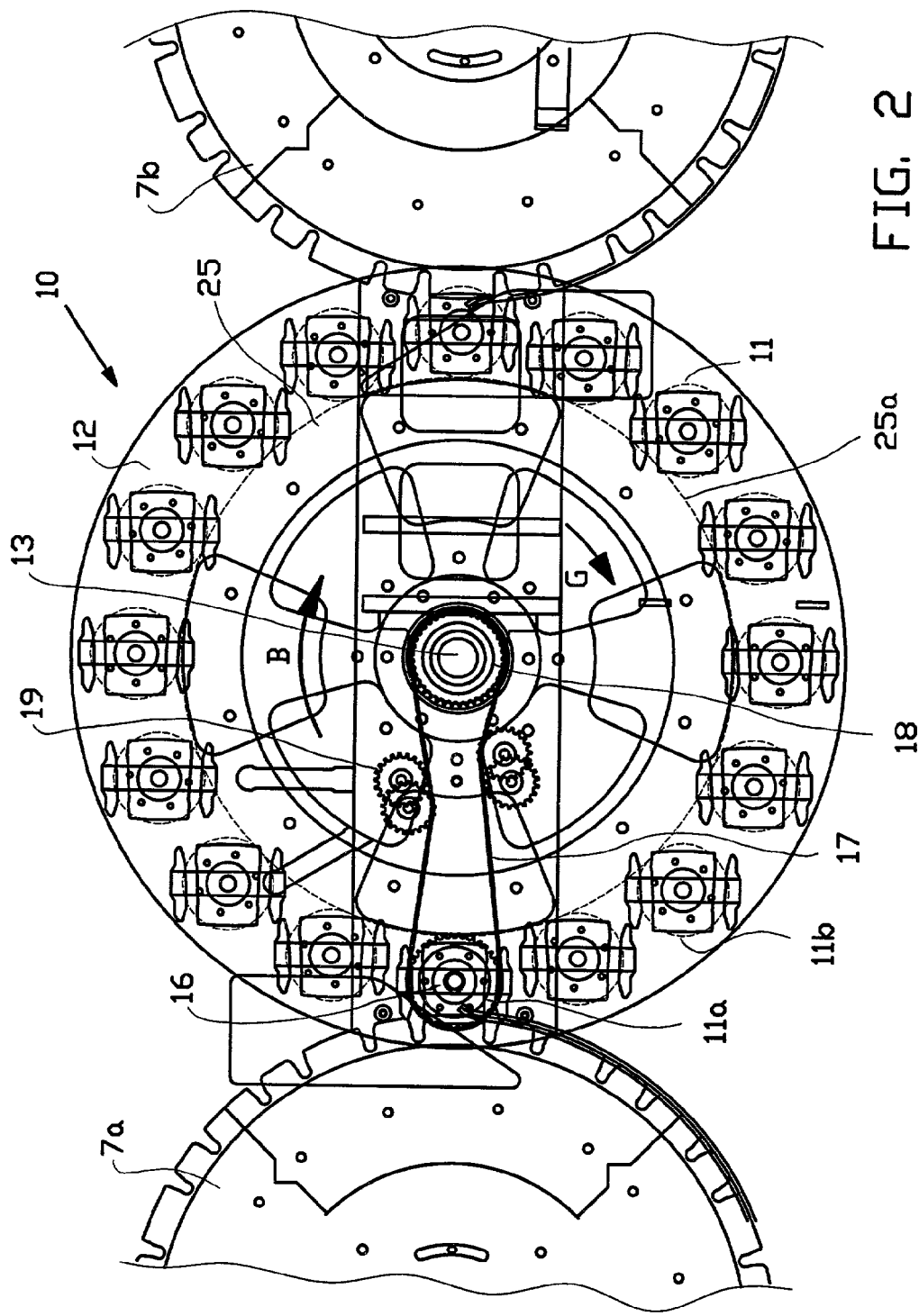
FIG. 2 shows a top view of a transfer wheel of an apparatus according to the invention.

In FIG. 2 a detail of the arrangement of FIG. 1B is schematically shown with transfer wheel 12 placed between two transfer wheels 7a and 7b, which themselves are contiguous to the first and second conveyors 2 and 5, respectively.

Figure 5:
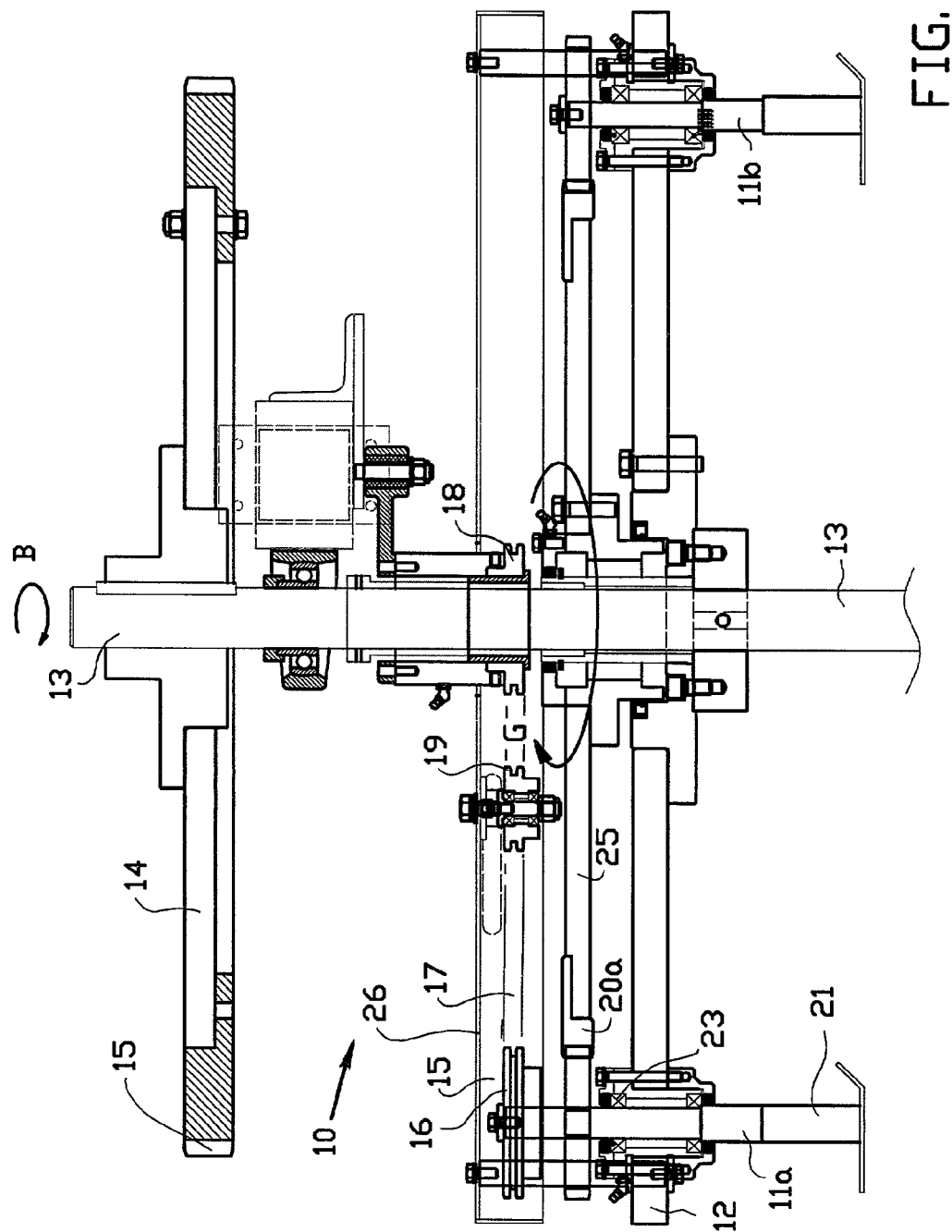
FIG. 5 schematically shows a vertical cross-section of the arrangement of the transfer wheel according to the FIGS. 2–4.
Figure 6A:
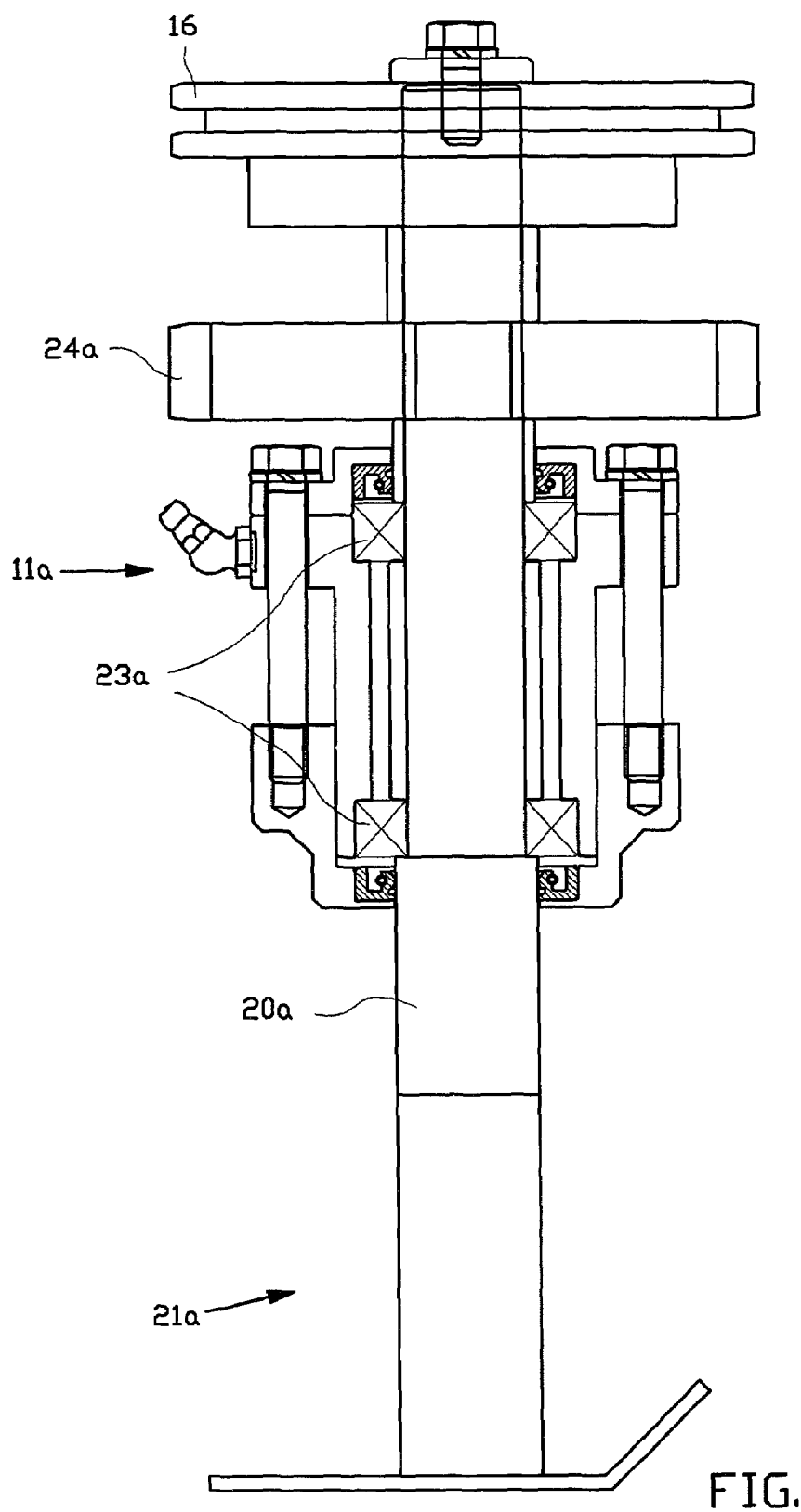
FIG. 6A schematically shows a vertical cross-section of a first holder for the transfer wheel of the preceding figures.
Figure 6B:
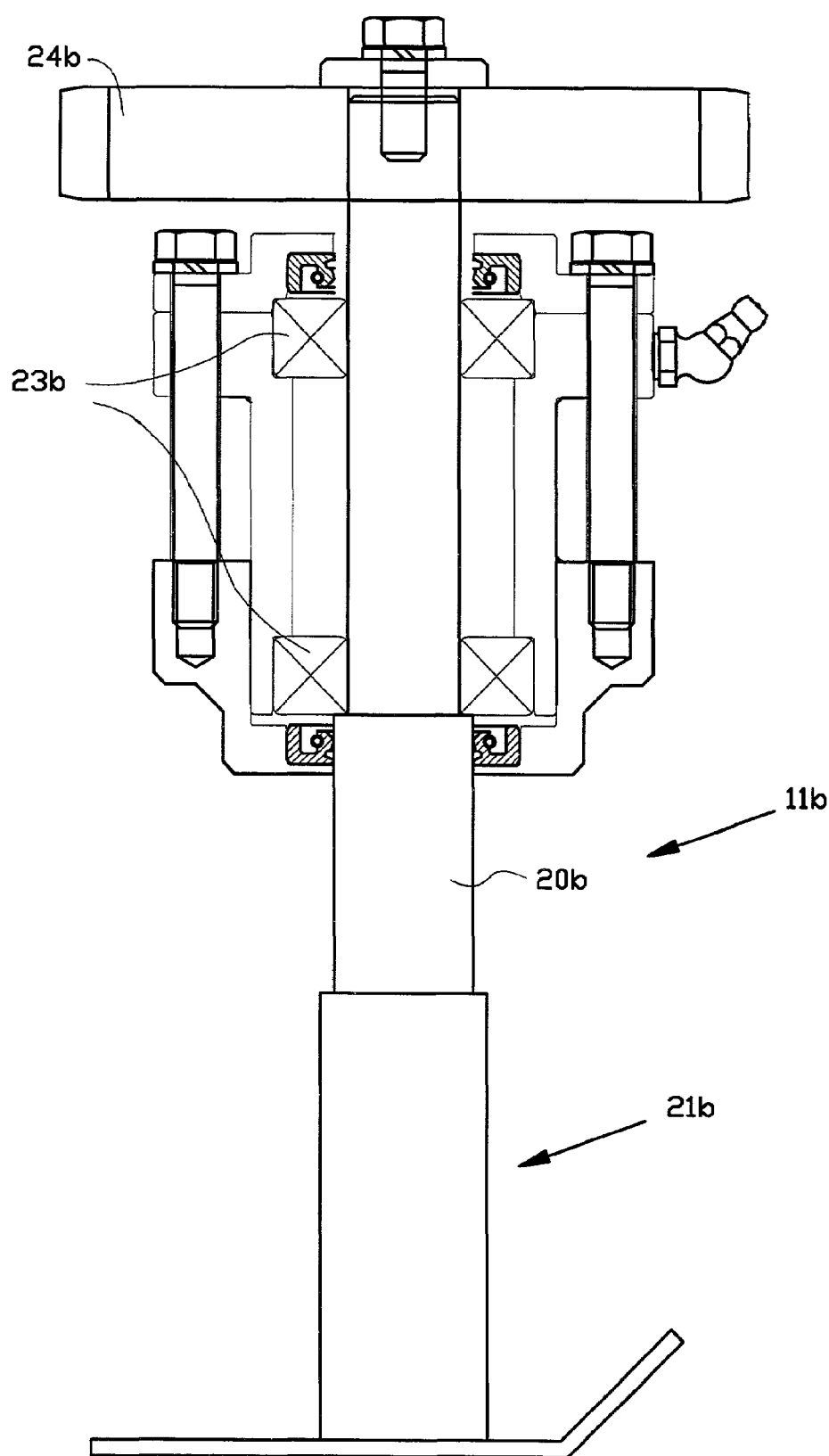
FIG. 6B schematically shows a vertical cross-section of a second holder for the transfer wheel according to FIGS. 2–5.

In the example of the figures sixteen holders 11 are rotatably supported on the transfer wheel 12. It here regards fifteen identical holders 11b and one different holder 11a, shown in FIGS. 6B and 6A, respectively. The holder 11a comprises a central shaft 20a, which by means of bearings 23a is rotatably bearing mounted in the transfer wheel 12. As can be seen in FIG. 5, the transfer wheel 12 is connected to the shaft 13 in a rotatably fixed manner. In its turn said shaft 13 is connected to a disc 14 in a rotatably fixed manner, which disc 14 at its circumference is provided with a toothing 15. Via said toothing 15 the shaft 13 is driven, for instance by coupling to one or both drives of the overhead conveyor, possible through the intermediary of synchronisation means.

Figure 3:
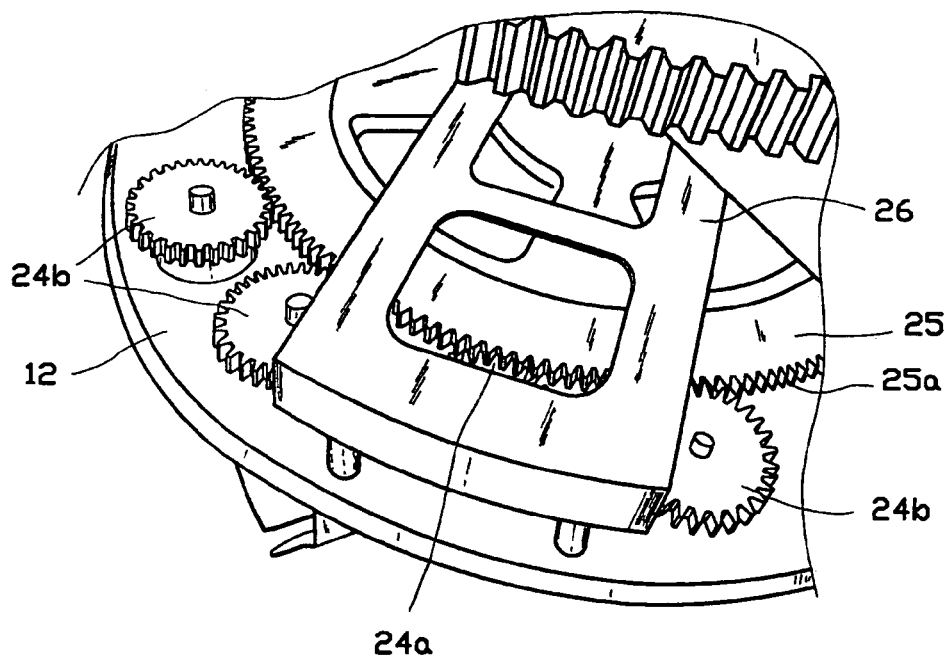
FIG. 3 shows a top view inclined from above of a part of the transfer wheel of FIG. 2.
Figure 4:
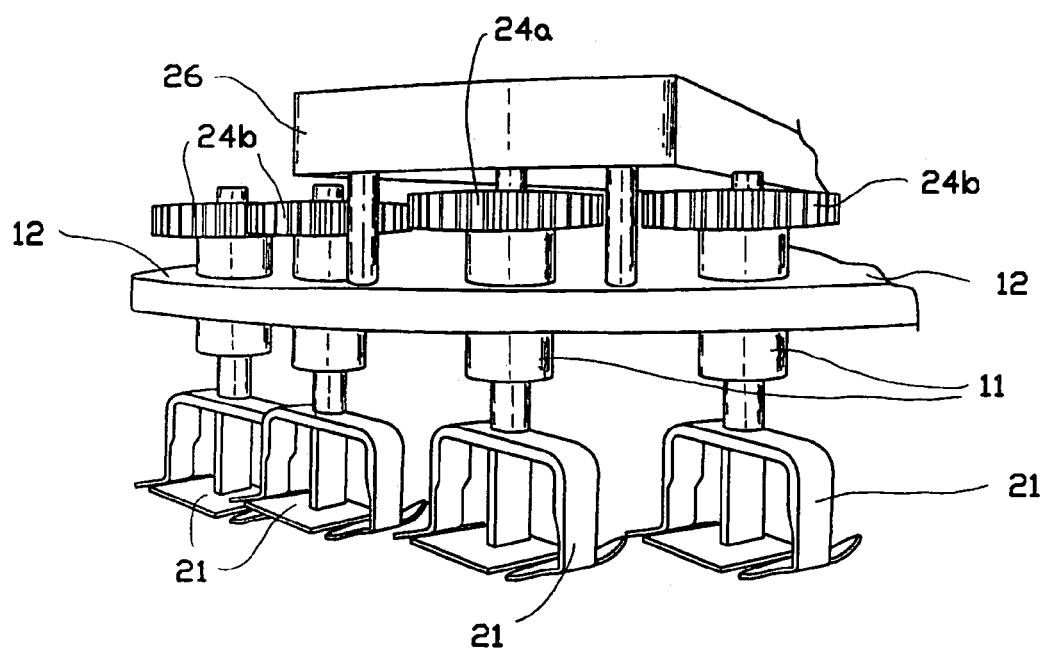
FIG. 4 shows a side view of the transfer wheel of the FIGS. 2 and 3.

On the shaft 13 there furthermore is a chain wheel 18, that is relatively rotatable with respect to the shaft 13, but which is stopped from rotating by a means that is not further shown. On the holder 11a, particularly at the upper end of the central shaft 20a, a chain wheel 16 is attached in a rotatably fixed manner, a chain 17 running around the chain wheels 16 and 18, as can be seen in FIG. 5. A chain tensioner 19 (also see FIG. 2) is provided here for keeping the chain 17 at the right tension. The chain transfer 15 with chain wheel 16 and chain 17, and also chain tensioner 19, are shielded to the outside and upwards by means of a hood 26, as can also be seen in FIG. 3.

Below the chain wheel 16 a toothed wheel 24a is attached to the central shaft 20a in an also rotatably fixed manner. Said toothed wheel 24a is meshed with a toothing 25a at the circumference of a large central toothed wheel 25 (also see FIG. 3), which central toothed wheel 25 is coaxial with and freely rotatable with respect to the shaft 13.

The other holders 11b are substantially equal to the holder 11a, but they are not provided with a chain wheel 16. They are also meshed with the teeth of their toothed wheel 24b with the toothing 25a of the central toothed wheel 25.

In this example the toothed wheels 24a, 24b have twenty-nine teeth, with a diameter of the pitch circle of 116 mm, and the central toothed wheel 25 has one hundred and seventy-six teeth, with a diameter of the pitch circle of 704 mm.

When the disc 14 and thus the shaft 13 is rotated in the direction B, the transfer wheel 12 will also rotate along. In that way also the holders 11a, 11b are taken along in rotation. As a result the chain wheel 16 is taken along as well, by the holder 11a. Because the chain wheel 16 is connected to the chain wheel 18 via chain 17, and said chain wheel 18 does not rotate along, the chain wheel 16 will counter rotate in the direction D (also see FIG. 1A). Because the diameters of the chain wheels 16 and 18 are equal, the spacial orientation of the holder 11a will not change during rotation of the transfer wheel 12.

The holder 11a will however rotate relatively with respect to the transfer wheel 12. Said rotational movement is transferred to the central toothed wheel 25 which because of the mesh with the holders 11 is taken along in the direction G (coinciding with the direction of rotation B), but rotating a little faster. Because of the mesh of the toothed wheels 24b of the holders 11b with the toothing 25a of the central toothed wheel 25, the holders 11b are also rotated with respect to the transfer wheel 12, in exactly the same degree and in the exact same direction as the holder 11a.

As can be seen in FIGS. 1A and 2 the spacial orientation of the holders 11 here remains the same, and thus of the carcasses suspended in the holders 11. In this way during transferring the carcasses from the first conveyor to the second conveyor, two birds are killed with one stone, because in that way it is also achieved that the carcasses are transferred to the second conveyor in the orientation suitable for the next treatment. In that way separate rotation means for the holders on the second conveyor 5 can be dispensed with. The transfer apparatus 10 in this way is very suitable to be deployed in-existing-slaughter lines with hangers that are not rotatable in themselves.

Figure 7A:
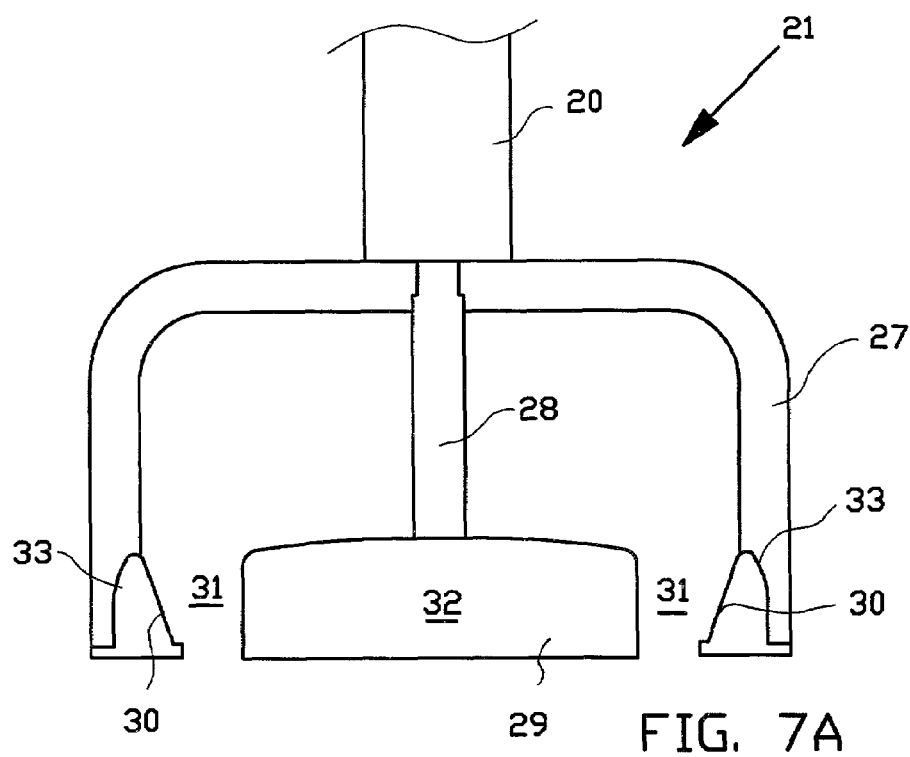
FIGS. 7A and 7B show a front view and a top view, respectively, of the hanging part of a holder for an apparatus according to the invention.
Figure 7B:
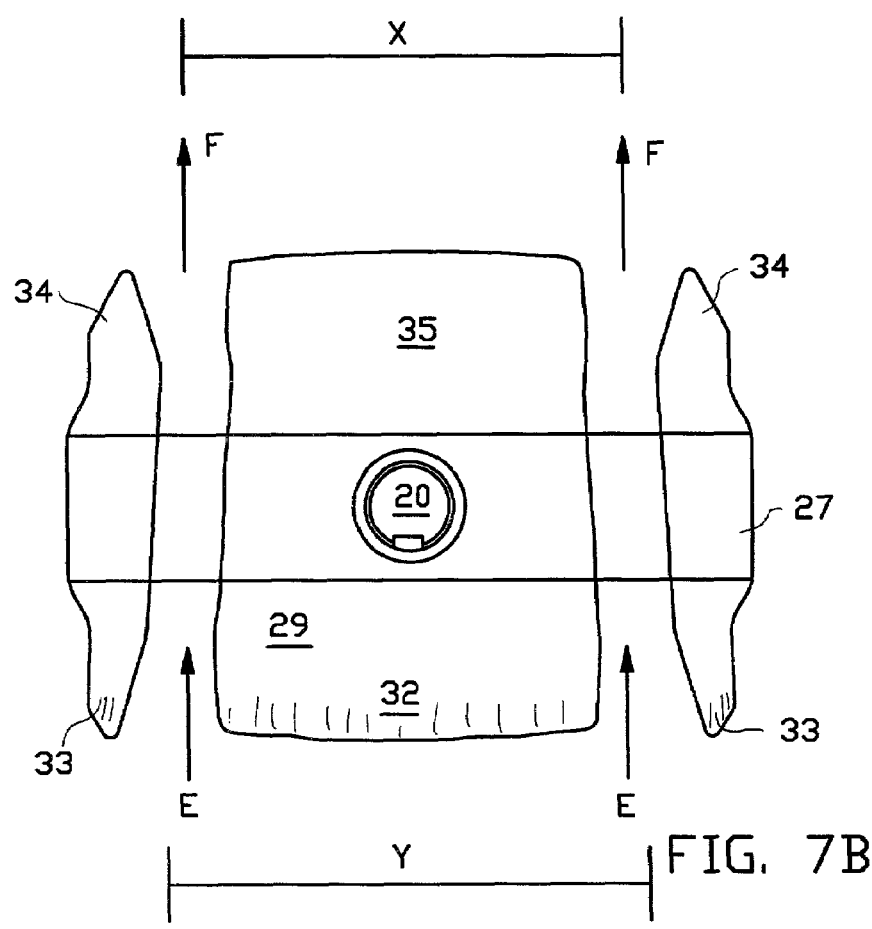

In the FIGS. 7A and 7B a hanger 21 is shown which is particularly suitable for the holder 11.

The hanger 21 is attached to the lower end of the shaft 20, in a rotatably fixed manner. The hanger comprises an inverted U-shaped shackle 27, at the lower ends of which narrow horizontal plates 30 are fixedly attached. At the insertion end the narrow plates 30 have been provided with inclined upwardly extending ends 33, and at the discharge side with flat ends 34.

In the middle a rod 28 extends downwards from the central shaft 20 which is fixedly attached to it, at the lower end of which rod a plate 29 is fixedly attached, which also at the insertion side is turned upwardly inclined with portions 32 and at the discharge end has a flat end member 35.

Between the plates 30 and the plate 29 thus two endless passages 31 have been formed. The legs of a carcass are inserted in that direction E, at the location of the transfer station 40. The inclined turned end portions 32 and 33 prevent that the legs can move back. During rotation of the transfer wheel 12 the carcass is suspended from the hangers 21 with the leg ends supported on the edges of the passages 31. Arrived at the transfer station 50 the legs are engaged with a suitable means and urged in the direction F out of the passages 31, in order to be accommodated in the holders of hangers of the second conveyor 5.

The distances X and Y between the access openings of the passages 31 situated on either side may differ from each other, in order to fit the (then different) leg distance in the hangers of the overhead conveyors situated near the opening in question.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

The invention claimed is:

1. An apparatus for transferring poultry carcasses suspended from shackles from a first overhead conveyor to a second overhead conveyor, comprising:
    a transfer wheel having a perimeter rotatable about a vertical axis for positioning between the first and the second overhead conveyors,
    said transfer wheel being provided with carcass holders at the perimeter of the transfer wheel that are movable with the transfer wheel and revolve about the vertical axis of the transfer wheel, said carcass holders each being rotatable with respect to said transfer wheel about its own vertical axis at the perimeter of said transfer wheel,
    holder orientation means operatively associated with said transfer wheel configured for rotating the carcass holders with respect to the transfer wheel about their respective axes and for equalizing the rotational orientation of the carcass holders from receipt of the carcasses on the transfer wheel to the discharge of the carcasses from the transfer wheel, the initial rotational orientation and the final rotational orientation of the carcasses being identical relative to the first overhead conveyor and to the second overhead conveyor.

2. An apparatus for transferring poultry carcasses suspended from shackles from a first overhead conveyor to a second overhead conveyor, comprising:
    a transfer wheel having a perimeter rotatable about a vertical axis for positioning between the first and the second overhead conveyors,
    said transfer wheel being provided with carcass holders at the perimeter of the transfer wheel that are movable with the transfer wheel and revolve about the vertical axis of the transfer wheel, said carcass holders being rotatable with respect to said transfer wheel,
    holder orientation means operatively associated with said transfer wheel configured for rotating the carcass holders with respect to the transfer wheel and for equalizing the rotational orientation of the carcass holders from receipt of the carcasses on the transfer wheel to the discharge of the carcasses from the transfer wheel, the initial rotational orientation and the final rotational orientation of the carcasses being identical relative to the first overhead conveyor and to the second overhead conveyor wherein the orientation means is adapted for keeping the rotational orientation of the carcass in the holder constant throughout the transport on the transfer wheel.

3. An apparatus according to claim 2, wherein each of said holders is bearing mounted in the transfer wheel to be rotatable about themselves about a vertical axis.

4. An apparatus according to claim 3, the orientation means being adapted for relative rotation of the holders with respect to the transfer wheel.

5. An apparatus according to claim 1, wherein the orientation means is adapted for rotating the holders 1:1 with respect to the rotation of the transfer wheel from receipt to discharge of the carcasses from the transfer wheel.

6. An apparatus according to claim 1, the orientation means comprising the first orientation means for orienting a first of the holders, and second orientation means for orienting others of the holders, which second orientation means are operated by the first orientation means.

7. An apparatus for transferring poultry carcasses suspended from shackles from a first overhead conveyor to a second overhead conveyor, comprising:
- a transfer wheel having a perimeter rotatable about a vertical axis for positioning between the first and the second overhead conveyors,
- said transfer wheel being provided with carcass holders at the perimeter of the transfer wheel that are movable with the transfer wheel and revolve about the vertical axis of the transfer wheel, said carcass holders being rotatable with respect to said transfer wheel,
- holder orientation means operatively associated with said transfer wheel configured for rotating the carcass holders with respect to the transfer wheel and for equalizing the rotational orientation of the carcass holders from receipt of the carcasses on the transfer wheel to the discharge of the carcasses from the transfer wheel, the initial rotational orientation and the final rotational orientation of the carcasses being identical relative to the first overhead conveyor and to the second overhead conveyor,
- the transfer wheel being connected to a vertical shaft in a rotatably fixed manner, the shaft being rotatable about the vertical axis, the first orientation means comprising a first driving disc provided on the first holder, a second driving disc placed loosely on the shaft but retained in spacial orientation, and a driving belt or driving chain running circumferentially about both said first and second driving discs.

8. An apparatus according to claim 7, the diameter of both driving discs being equal.

9. An apparatus for transferring poultry carcasses suspended from shackles from a first overhead conveyor to a second overhead conveyor, comprising:
- a transfer wheel having a perimeter rotatable about a vertical axis for positioning between the first and the second overhead conveyors,
- said transfer wheel being provided with carcass holders at the perimeter of the transfer wheel that are movable with the transfer wheel and revolve about the vertical axis of the transfer wheel, said carcass holders being rotatable with respect to said transfer wheel,
- holder orientation means operatively associated with said transfer wheel configured for rotating the carcass holders with respect to the transfer wheel and for equalizing the rotational orientation of the carcass holders from receipt of the carcasses on the transfer wheel to the discharge of the carcasses from the transfer wheel, the initial rotational orientation and the final rotational orientation of the carcasses being identical relative to the first overhead conveyor,
- the orientation means comprising the first orientation means for orienting a first of the holders, and second orientation means for orienting others of the holders, which second orientation means are operated by the first orientation means, and
- the second orientation means comprising a first toothed wheel that is attached to the first holder in a rotably fixed manner, a central toothed wheel freely rotatable on a shaft and driven by the first toothed wheel, and second toothed wheels each attached in a rotably fixed manner to the other holders, which second toothed wheels are in driven engagement with the central toothed wheel.

10. An apparatus according to claim 9, wherein the second toothed wheels each having a diameter that is equal to the diameter of the first toothed wheel.

11. An apparatus for transferring poultry carcasses from a first overhead conveyor to a second overhead conveyor, in which overhead conveyors the carcasses are transported suspended from shackles comprising:
- a transfer wheel rotatable about a vertical axis and positioned between both the first and the second overhead conveyors,
- said transfer wheel being provided with holders for the carcasses that are radially spaced from said vertical axis of said transfer wheel and movable with the transfer wheel to revolve about the vertical axis of the transfer wheel from the first overhead conveyor to the second overhead conveyor, each said holder having an upwardly extending central shaft about which it rotates, and
- orientation means responsive to the rotation of said transfer wheel for rotating each of said holders about its respective central shaft and with respect to the transfer wheel during the transport of the holders by the transfer wheel from the first overhead conveyor to the second overhead conveyor to deliver the carcasses, to the second overhead conveyor in the same rotational orientation as received from the first overhead conveyor.

12. An apparatus according to claim 11, wherein the orientation means is adapted for 1:1 continuous rotation of the holders with respect to the transfer wheel.

13. An apparatus for transferring poultry carcasses from a first overhead conveyor to a second overhead conveyor, comprising:
- a transfer wheel rotatable about a shaft and having a perimeter, said transfer wheel disposed between the first and the second overhead conveyors;
- a carcass receipt point and a carcass discharge point, the carcass receipt point being disposed between the first overhead conveyor and the transfer wheel, the carcass discharge point being disposed between the transfer wheel and the second overhead conveyor;
- a plurality of holders, each holder being rotatably mounted on said transfer wheel at the perimeter of the transfer wheel and configured to receive one of the carcasses from the first overhead conveyor at the carcass receipt point and to discharge the carcass to the second overhead conveyor at the carcass discharge point; and
- holder orientation means responsive to the continuous rotation of said transfer wheel for continuously rotating said holders in unison with respect to said transfer wheel;
- said holder orientation means configured so that each carcass received by a holder maintains its rotational orientation as received at the carcass receipt point continuously until delivered to the carcass discharge point.

14. The apparatus according to claim 13, and further including a toothed wheel engaging each holder for rotating each holder in unison in response to the rotation of said transfer wheel.

15. The apparatus according to claim 13, wherein each holder is operatively connected to the other holders and each holder maintains a constant orientation relative to the other holders as it rotates with respect to the transfer wheel.

16. An apparatus for transferring poultry carcasses from a first overhead conveyor to a second overhead conveyor, comprising:

a transfer wheel positioned between said first and second overhead conveyors, said transfer wheel having a central axis and a perimeter rotatable about said central axis, a plurality of bird holders spaced about said perimeter of said transfer wheel for receiving the poultry carcasses from said first overhead conveyor and carrying the poultry carcasses from said first overhead conveyor about said central axis to said second overhead conveyor and delivering the carcasses to said second overhead conveyor, said bird holders each being rotatable about an upwardly extending axis at the perimeter of said transfer wheel, and orientation control means responsive to the rotation of said transfer wheel for rotating the bird holders with respect to the transfer wheel about their respective upwardly extending axes and for equalizing the rotational orientation of the bird holders about said upwardly extending axes from receipt of the carcasses on the transfer wheel to the discharge of the carcasses from the transfer wheel to deliver the carcasses to the second overhead conveyor in the same rotational orientation as received from the first overhead conveyor.

* * * * *